United States Patent
Keppel et al.

(10) Patent No.: US 9,454,278 B2
(45) Date of Patent: Sep. 27, 2016

(54) WEIGHTING FOR DISPLAY NOISE REMOVAL IN CAPACITIVE SENSORS

(71) Applicant: Synaptics Incorporated, San Jose, CA (US)

(72) Inventors: Drew Garvin Keppel, Peoria, AZ (US); Shubha Ramakrishnan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 12 days.

(21) Appl. No.: 14/671,989

(22) Filed: Mar. 27, 2015

(65) Prior Publication Data

US 2015/0309618 A1 Oct. 29, 2015

Related U.S. Application Data

(60) Provisional application No. 61/984,551, filed on Apr. 25, 2014.

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ................ G06F 3/044; G06F 3/0416–3/0418
See application file for complete search history.

(56) References Cited

U.S. PATENT DOCUMENTS

| | | | |
|---|---|---|---|
| 6,177,918 B1 | 1/2001 | Colgan et al. | |
| 6,215,477 B1 | 4/2001 | Morrison et al. | |
| 6,310,611 B1 | 10/2001 | Caldwell | |
| 6,624,835 B2 | 9/2003 | Willig | |
| 7,315,300 B2 | 1/2008 | Hill et al. | |
| 8,121,806 B2 | 2/2012 | Mahowald et al. | |
| 8,294,687 B1 * | 10/2012 | Ksondzyk | G06F 3/0418 178/18.01 |
| 8,400,422 B2 | 3/2013 | Chang et al. | |
| 8,411,066 B2 | 4/2013 | Cordeiro et al. | |
| 8,456,443 B2 | 6/2013 | Bulea et al. | |
| 8,471,570 B2 | 6/2013 | Portmann | |
| 8,508,503 B2 | 8/2013 | Lin et al. | |
| 8,536,880 B2 | 9/2013 | Philipp | |
| 8,614,690 B2 | 12/2013 | Grunthaner et al. | |
| 8,648,835 B2 | 2/2014 | Rapakko | |
| 8,723,833 B2 | 5/2014 | Curtis et al. | |
| 8,736,573 B2 | 5/2014 | Byun et al. | |
| 8,743,062 B2 | 6/2014 | Krah et al. | |
| 8,847,914 B2 * | 9/2014 | Doi | G06F 3/044 178/18.06 |
| 8,902,192 B2 | 12/2014 | Miyamoto et al. | |
| 8,917,249 B1 * | 12/2014 | Buuck | G06F 3/0418 345/173 |

(Continued)

*Primary Examiner* — Patrick F Marinelli

(57) ABSTRACT

A processing system for a capacitive sensing input device comprises a sensor module and a determination module. The sensor module acquires a plurality of capacitive resulting signals by operating a plurality of sensor electrodes for capacitive sensing. The determination module weights values of the plurality of capacitive resulting signals to achieve a plurality of weighted capacitive resulting signals, wherein a first capacitive resulting signal of the plurality of capacitive resulting signals is weighted according to a weighted noise parameter derived from a component of a variable noise associated with a respective sensor electrode used for acquisition of the first capacitive resulting signal, wherein the variable noise varies across the plurality of sensor electrodes. The determination module also determines positional information for an least input object in a sensing region of the capacitive sensing input device based on resulting signals processed from the weighted capacitive resulting signals.

18 Claims, 7 Drawing Sheets

(56) References Cited

U.S. PATENT DOCUMENTS

| | | |
|---|---|---|
| 8,947,373 B2 | 2/2015 | Kremin et al. |
| 9,024,906 B2* | 5/2015 | Westerman .......... G06F 3/0488 345/173 |
| 9,081,435 B2 | 7/2015 | Kim et al. |
| 9,128,570 B2* | 9/2015 | Vallis ..................... G06F 3/044 |
| 9,209,802 B1* | 12/2015 | Maharyta ............. H03K 17/955 |
| 9,256,328 B2* | 2/2016 | Kwon ................... G06F 3/0418 |
| 9,256,333 B2* | 2/2016 | Singh ..................... G06F 3/044 |
| 2002/0089491 A1 | 7/2002 | Willig |
| 2006/0007171 A1 | 1/2006 | Burdi et al. |
| 2009/0174675 A1 | 7/2009 | Gillespie et al. |
| 2010/0079401 A1 | 4/2010 | Staton |
| 2010/0079402 A1 | 4/2010 | Grunthaner et al. |
| 2011/0242045 A1 | 10/2011 | Park et al. |
| 2011/0242050 A1 | 10/2011 | Byun et al. |
| 2012/0133599 A1 | 5/2012 | Cho et al. |
| 2012/0139846 A1 | 6/2012 | Krah et al. |
| 2012/0139868 A1 | 6/2012 | Mamba et al. |
| 2012/0182252 A1 | 7/2012 | Brosnan et al. |
| 2012/0194452 A1* | 8/2012 | Cho ...................... G06F 3/0416 345/173 |
| 2012/0200524 A1* | 8/2012 | Vallis ..................... G06F 3/044 345/174 |
| 2012/0206407 A1 | 8/2012 | Taylor et al. |
| 2012/0249476 A1 | 10/2012 | Schwartz et al. |
| 2012/0262384 A1 | 10/2012 | Kim et al. |
| 2012/0306803 A1 | 12/2012 | Kuo |
| 2013/0120309 A1* | 5/2013 | Mo ....................... G06F 3/0416 345/174 |
| 2013/0176233 A1 | 7/2013 | Lin et al. |
| 2013/0234978 A1* | 9/2013 | Ksondzyk ............. G06F 3/0418 345/174 |
| 2013/0265242 A1 | 10/2013 | Richards et al. |
| 2014/0022211 A1* | 1/2014 | Karpin ................... G06F 3/044 345/174 |
| 2014/0062952 A1 | 3/2014 | Savitsky et al. |
| 2015/0015528 A1* | 1/2015 | Vandermeijden ..... G06F 3/0416 345/174 |
| 2015/0015539 A1* | 1/2015 | Fotopoulos ........... G06F 3/0416 345/174 |
| 2015/0035794 A1* | 2/2015 | Zhitomirskiy .......... G06F 3/044 345/174 |
| 2015/0212623 A1* | 7/2015 | Hatano ................... G06F 3/044 345/174 |
| 2015/0309618 A1* | 10/2015 | Keppel, Jr. ............ G06F 3/0418 345/174 |
| 2016/0092028 A1* | 3/2016 | Vallis ..................... G06F 3/044 345/174 |

* cited by examiner

600

---

OPERATING, BY A PROCESSING SYSTEM, A PLURALITY SENSOR ELECTRODES TO ACQUIRE A PLURALITY OF CAPACITIVE RESULTING
610

↓

WEIGHTING, BY THE PROCESSING SYSTEM, VALUES OF THE PLURALITY OF CAPACITIVE RESULTING SIGNALS TO ACHIEVE A PLURALITY OF WEIGHTED CAPACITIVE RESULTING SIGNALS, WHEREIN A FIRST CAPACITIVE RESULTING SIGNAL OF THE PLURALITY OF CAPACITIVE RESULTING SIGNALS IS WEIGHTED ACCORDING TO A WEIGHTED NOISE PARAMETER DERIVED FROM A COMPONENT OF A VARIABLE NOISE ASSOCIATED WITH A RESPECTIVE SENSOR ELECTRODE USED FOR ACQUISITION OF THE FIRST CAPACITIVE RESULTING SIGNAL, WHEREIN THE VARIABLE NOISE VARIES ACROSS THE PLURALITY OF SENSOR ELECTRODES
620

↓

FILTERING, BY THE PROCESSING SYSTEM, THE WEIGHTED CAPACITIVE RESULTING SIGNALS TO REMOVE COMMON NOISE AND TO ACHIEVE A PLURALITY OF FILTERED CAPACITIVE RESULTING SIGNALS
630

↓

DE-WEIGHTING, BY THE PROCESSING SYSTEM, THE FILTERED CAPACITIVE RESULTING SIGNALS ACCORDING TO THE WEIGHTED NOISE PARAMETERS TO ACHIEVE A PLURALITY OF PROCESSED CAPACITIVE RESULTING SIGNALS
640

↓

DETERMINING, BY THE PROCESSING SYSTEM, A CAPACITIVE IMAGE FROM THE PROCESSED CAPACITIVE RESULTING SIGNALS
650

FIG. 6A

WEIGHTING FOR DISPLAY NOISE REMOVAL IN CAPACITIVE SENSORS

CROSS-REFERENCE TO RELATED APPLICATIONS (PROVISIONAL)

This application claims priority to and benefit of U.S. Provisional Patent Application No. 61/984,551, filed on Apr. 25, 2014, entitled "Weighting for Display Noise Removal," by Drew Garvin Keppel, and assigned to the assignee of the present application, the disclosure of which is hereby incorporated herein by reference in its entirety.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

According to some embodiments, a processing system for a capacitive sensing input device comprises a sensor module and a determination module. According to some embodiments, the sensor module acquires a plurality of capacitive resulting signals by operating a plurality of sensor electrodes for capacitive sensing. According to some embodiments, the determination module weights values of the plurality of capacitive resulting signals to achieve a plurality of weighted capacitive resulting signals, wherein a first capacitive resulting signal of the plurality of capacitive resulting signals is weighted according to a weighted noise parameter derived from a component of a variable noise associated with a respective sensor electrode used for acquisition of the first capacitive resulting signal, wherein the variable noise varies across the plurality of sensor electrodes. According to some embodiments, the determination module also determines positional information for an least input object in a sensing region of the capacitive sensing input device based on resulting signals processed from the weighted capacitive resulting signals.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 6A and 6B illustrate a flow diagram of an example method of capacitive sensing, according to various embodiments.

DESCRIPTION OF EMBODIMENTS

Figure 1:
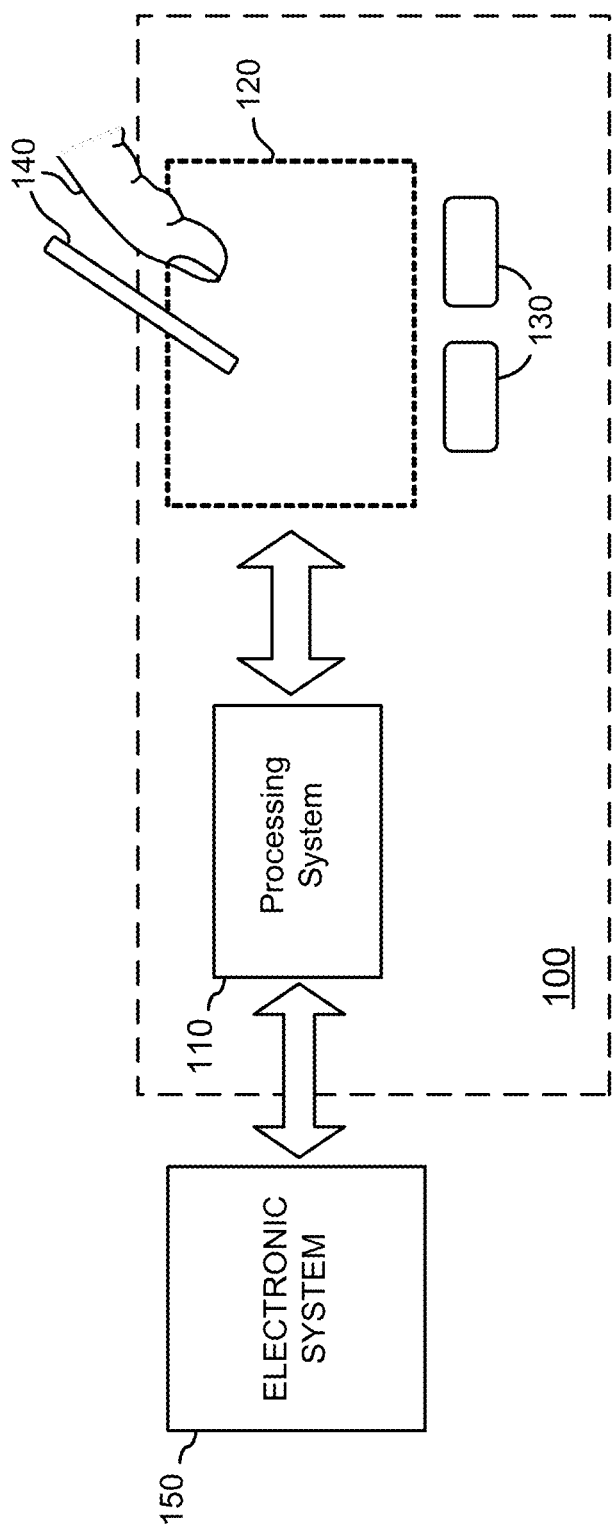
FIG. 1 is a block diagram of an example input device, in accordance with embodiments.

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Various examples herein are illustrated and discussed with respect to capacitive sensing and a capacitive sensing input device, however, it should be appreciated that other input detection techniques and input devices may be similarly employed with the techniques and methods discussed herein. An input device such as a touch screen is typically disposed as part of a user interface/display of an electronic device or system, such as a tablet computer or mobile phone. Because of this, display noise often appears in measurements made by the input device. Display noise can result in noise offsets along the transmitter electrodes associated with capacitance sensing that are almost constant. Conventionally, this noise has been believed to be constant and treated as constant. The amount that these offsets are not constant results in additional noise present in the filtered capacitance measurements where these constant offsets have been estimated and removed. Herein, methods, techniques, processing systems, sensors, and input devices are described which remove the spatially variable portion of this noise that is relatively proportional along sensor electrodes that are used for receiving capacitive resulting signals. Removing this variable portion of display noise is a way to supplement existing noise removal algorithms and improve the operating of capacitive sensors and input devices. In many modern electronic devices and systems, the use of shieldless capacitive sensors is sometimes desirable due to the capacitive sensors typically including fewer components and being thinner than similar sensors which are shielded. In particular, the methods and techniques described herein are beneficial with shieldless capacitive sensors (which experience more display coupled noise due to being shieldless), and can improve their operating sensitivity such that they are operable in a broader range applications.

Discussion begins with a description of an example input device with which or upon which various embodiments described herein may be implemented. An example sensor electrode pattern is then described. This is followed by description of an example processing system and some components thereof which may be employed for capacitive sensing where a technique of weighting for display noise removal is employed. The processing system may be utilized with or as a portion of an input device, such as a capacitive sensing input device. A description of the general technique of weighting for display noise removal is then provided. Operation of the input devices, processing systems, and components thereof are then further described in conjunction with description of an example method of capacitive sensing.

Example Input Device

Turning now to the figures, FIG. 1 is a block diagram of an example input device 100, in accordance with various embodiments. Input device 100 may be configured to provide input to an electronic system/device 150. In some embodiments, the input device is a shieldless input device. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As several non-limiting examples, input device 100 may use acoustic, ultrasonic, capacitive, elastive, resistive, inductive, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Display noise of a nearby or co-located (e.g., overlapping) display may be represented in the resulting signal that is received during absolute capacitive sensing.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, in some embodiments, the resulting signal represents noise detected in the operating environment of sensing region 120. For example, display noise of a nearby or co-located (e.g., overlapping) display may be represented in the resulting signal that is received during transcapacitive sensing.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a transcapacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. "Zero-dimensional" positional information includes near/far or contact/no contact information. "One-dimensional" positional information includes positions along an axis. "Two-dimensional" positional information includes motions in a plane. "Three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
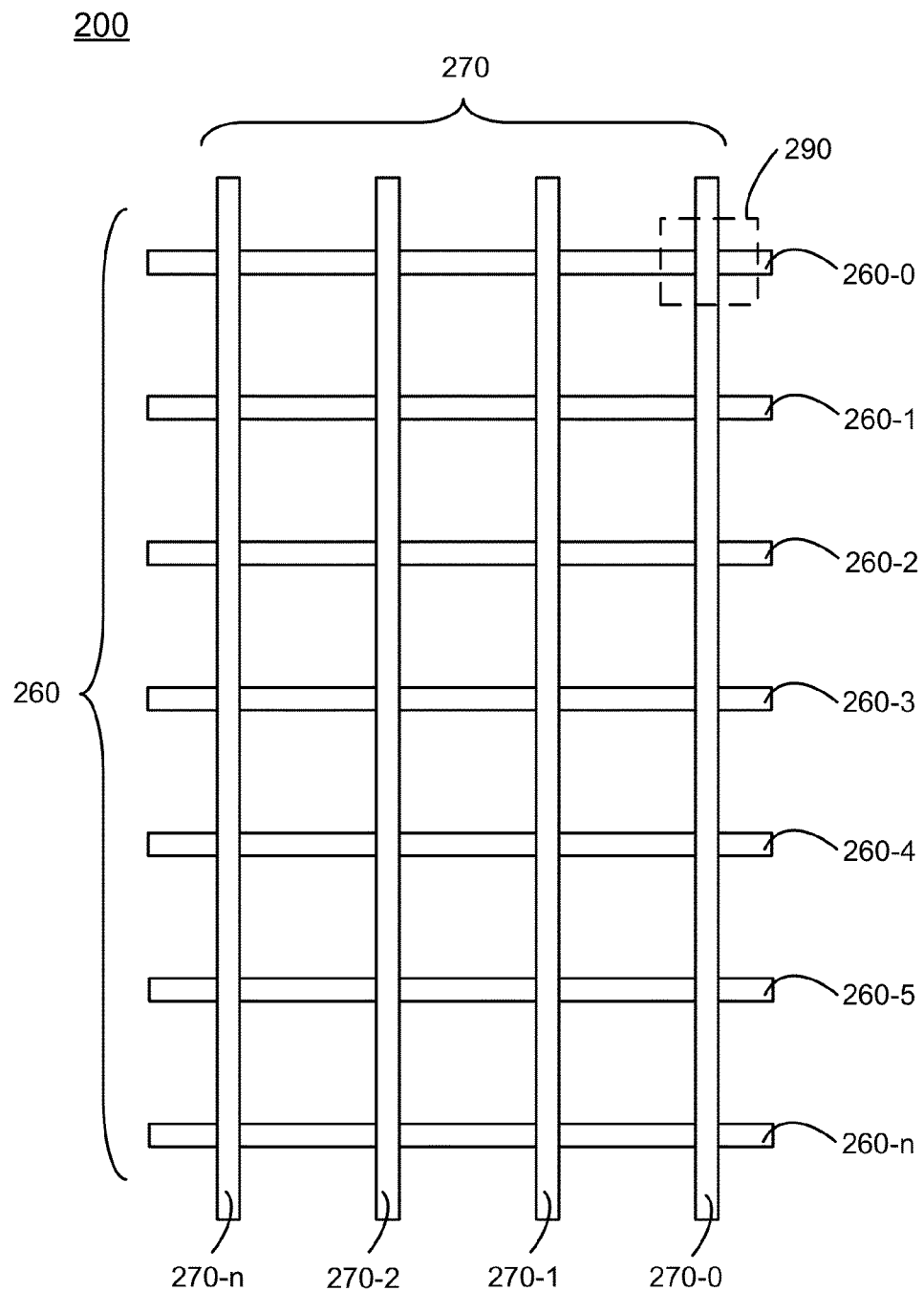
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. In some embodiments, input device 100 is shieldless and does not include a shield between the display and the capacitive sensor electrodes which would lessen the coupling of display noise into sensor electrodes of the sensor electrode pattern (e.g., sensor electrode pattern 200 that is utilized). For purposes of clarity of illustration and description, a non-limiting simple rectangular sensor electrode pattern 200 is illustrated. It is appreciated that numerous other sensor electrode patterns may be employed with the techniques described herein, including but not limited to: patterns with a single sensor electrode, patterns with a single set of sensor electrodes, patterns with two sets of sensor electrodes disposed in a single layer (without overlapping), patterns with two sets of sensor electrodes disposed in a single layer employing jumpers at crossover regions between sensor electrodes, patterns that utilize one or more display electrodes of a display device such as one or more segments of a common voltage ($V_{COM}$) electrode, source electrodes, gate electrodes, anode electrodes and cathode electrodes, and patterns that provide individual button electrodes. The illustrated sensor electrode pattern is made up of a first plurality of sensor electrodes 270 (270-0, 270-1, 270-2 . . . 270-$n$) and a second plurality of sensor electrodes 260 (260-0, 260-1, 260-2 . . . 260-$n$) which overlay one another, in this example. In many embodiments, processing system 110 is configured to operate the second plurality of sensor electrodes 260 as transmitter electrode by driving them with transmitter signals and the first plurality of sensor electrodes 270 as receiver electrodes by receiving resulting signals with them. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels where transmitter electrodes 260 and receiver electrodes 270 cross or interact to measure a transcapacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Background capacitance, $C_B$, is the capacitive image of a sensor pattern or the absolute capacitance measured on a sensor electrode with no input object in the sensing region of a sensor electrode pattern. The background capacitance changes with the environment and operating conditions.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during absolute capacitive sensing. This type of charge offsetting is accomplished external to the ASIC/processing system. It should be appreciated that any of the external charge offsetting techniques described herein may be utilized alone or may be used in combination with one or more internal charge offsetting techniques.

Various algorithms and techniques may also be used to filter out a constant component of display noise that is coupled into sensor electrode and present in a resulting signal. Many techniques for removing a constant component of display noise from capacitive resulting signals are known in the art. Additionally, as described herein, a spatially variable portion of display noise can be removed from a capacitive resulting signal. Removing both a constant component of display noise and a variable component of display noise allows for a cleaner signal to be created and thus for improved sensitivity of a capacitive sensor in a variety of environments and uses.

Example Processing System

Figure 3:
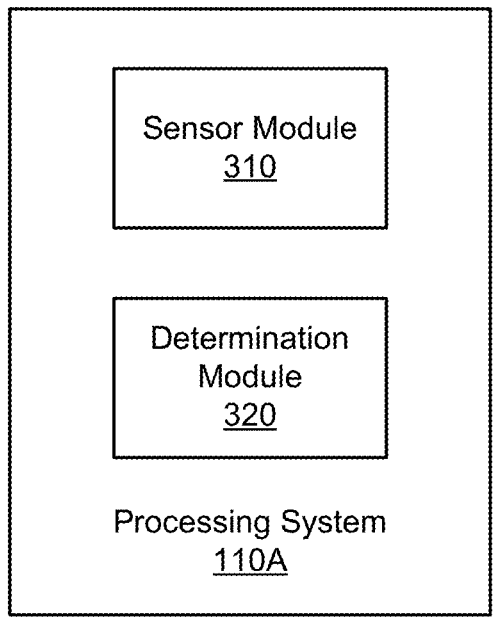
FIG. 3 illustrates a block diagram of some components of an example processing system that may be utilized with an input device, according to various embodiments.

FIG. 3 illustrates a block diagram of some components of an example processing system 110A that may be utilized with a capacitive sensing input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

In many embodiments, sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing.

Sensor module 310 is configured to acquire transcapacitive resulting signals by transmitting with a first one of a plurality of sensor electrodes of the input device and receiving with a second one of the plurality of sensor electrodes. During transcapacitive sensing, sensor module 310 operates to drive or transmit transmitter signals on one or more sensor electrodes of a first plurality of sensor electrodes (e.g., one or more of transmitter electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signals may be coded according to a code. The code may be altered, such as lengthening or shortening the code. Sensor module 310 also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that sensor module 310 may, in a similar fashion, transmit transmitter signals on one or more of sensor electrodes 270 and receive corresponding resulting signals on one or more of sensor electrodes 260.

In absolute capacitive sensing, a sensor electrode is both driven and used to receive a resulting signal that results from the signal driven on to the sensor electrode. In this manner, during absolute capacitive sensing, sensor module 310 operates to drive a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, sensor module 310 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Determination module 320 may be implemented as hardware (e.g., hardware logic and/or other circuitry) and/or as a combination of hardware and instructions stored in a non-transitory manner in a computer readable storage medium.

Determination module 320 operates to compute/determine a measurement of a change in a transcapacitive coupling between a first and second sensor electrode during transcapacitive sensing. Determination module 320 then uses such measurements to determine the positional information comprising the position of an input object (if any) with respect to sensing region 120. The positional information can be determined from a transcapacitive image. The transcapacitive image is determined by determination module 320 based upon resulting signals acquired by sensor module 310. The resulting signals are used as or form capacitive pixels representative of input(s) relative to sensing region 120. It is appreciated that determination module 320 operates to decode and reassemble coded resulting signals to construct a transcapacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling to a sensor electrode. For example, determination module 320 operates to determine an absolute capacitance of the sensor electrode (e.g., sensor electrode 270-0) after a sensing signal has been driven on the sensor electrode. Determination module 320 then uses such measurements to determine the positional information comprising the position of an input object (if any) with respect to sensing region 120. The positional information can be determined from, for example, an absolute capacitive image or from absolute capacitive profiles.

In some embodiments determination module 320 may utilize measurements (i.e., resulting signals) obtained from both absolute capacitive sensing and transcapacitive sensing (instead of using measurements from just one type of these types capacitive sensing) in determining a position of an input object relative to sensing region 120. This is sometimes referred to has hybrid capacitive sensing.

In some embodiments, processing system 110A comprises decision making logic which directs one or more portions of processing system 110A, such as sensor module 310 and/or determination module 320, to operate in a selected one of a plurality of different operating modes based on various inputs. Determination module 320 then uses such measurements to determine the positional information comprising the position of an input object (if any) with respect to sensing region 120. The positional information can be determined from a hybrid capacitive image.

In accordance with embodiments described herein, determination module 320 is also configured to employ techniques of weighting resulting signals to remove display noise. This includes removing a constant (i.e., common) component of display noise as well as a variable component (varies from receiving electrode to receiving electrode). As such, determination module 320 is configured for weighting values of capacitive resulting signals to achieve weighted capacitive resulting signals, filtering the weighted capacitive resulting signals, and de-weighting the filtered capacitive resulting signals to achieve processed capacitive resulting signals. Determination module 320 can then determine positional information of an input object with respect to sensing region 120 from the processed capacitive resulting signals.

When weighting capacitive resulting signals, each capacitive resulting signal is weighted by determination module 320 in accordance with a weighted noise parameter that is derived from a component of a variable noise associated with a respective sensor electrode used for acquisition of the capacitive resulting signal that is being weighted. Variable noise, which is typically display coupled noise, varies across a plurality of sensor electrodes in a sensor electrode pattern. This variation occurs for a variety of reasons, with one of the primary reasons being that each sensor electrode couples display noise slightly differently than the other sensor electrodes in a sensor electrode pattern. Because the variable component of display coupled noise tends to vary from receiving electrode to receiving electrode, the weighting may (and typically does) vary from one sensor electrode to another. As such, determination module 320, in some embodiments, weights a second capacitive resulting signal of the plurality of capacitive resulting signals according to a second weighted noise parameter derived from a second component of the variable noise associated with a second respective sensor electrode used for acquisition of the second capacitive resulting signal, wherein different weighted noise parameters are used for weighting the first capacitive resulting signal and the second capacitive resulting signal.

In some embodiments, determination module 320 filters weighted capacitive resulting signals to remove common noise and to achieve a plurality of filtered capacitive resulting signals. This filtering can comprise filtering the weighted capacitive resulting signals to remove a constant offset of noise that is common to all sensor electrodes and is attributed to the display coupled noise. Conventional filtering techniques can be utilized to perform this filtering, as these techniques presume a constant/common noise. The difference is that the conventional filtering techniques are not being applied to raw capacitive resulting signals, but rather to capacitive resulting signals that have been weighted (to flatten them) in accordance with calculated variable components of noise attributable to the sensor electrodes used to receive the capacitive resulting signals.

In some embodiments, once the filtering for common noise has been accomplished, the filtered capacitive resulting signals are de-weighted by determination module 320. The de-weighting undoes the weighting, and is accomplished, in a reverse manner to the weighting, according to the same weighted noise parameters that were used for weighting the capacitive resulting signals. The de-weighting achieves a plurality of processed capacitive resulting signals. It should be appreciated that by weighting the resulting signals in the manner described, a constant/common noise removal algorithm will also operate to remove the variable portion of display coupled noise once the filtered resulting signals are de-weighted.

In an embodiment where the processed resulting signals are obtained from transcapacitive sensing, determination module 320 may determine a transcapacitive image from a plurality of processed resulting signals. In an embodiment where the processed resulting signals are obtained from absolute capacitive sensing, determination module 320 may determine an absolute capacitive image or one or more absolute capacitive profiles from a plurality of processed resulting signals. In an embodiment where the processed resulting signals are obtained from absolute capacitive sensing and transcapacitive sensing, determination module 320 may determine a hybrid capacitive image from a plurality of processed resulting signals. In some embodiments, constant and variable display noise is filtered from contributing transcapacitive resulting signals and absolute capacitive resulting signals, in the manner described herein, before they are utilized to form a hybrid capacitive image. In any case, determination module 320 is configured to and operates to determine, from the image(s) and/or profile(s), positional information for an input object that was in sensing region 120 during the time of acquisition of the resulting signals used to produce the processed resulting signals.

In some embodiments, determination module 320 is also configured and operated to estimate the weighted noise parameters that are used for the weighting and de-weighting described above. Some example techniques for accomplishing this estimation are described in further detail below under the heading "General Technique of Weighting for Display Noise Removal." In general, this involves determination module 320 acquiring a control set of capacitive resulting signals when no input object is determined to be interacting with the plurality of sensor electrodes. This can be accomplished in a factory environment and/or at a particular time or at some interval. Some non-limiting particular times for estimating such weights include startup time and/or shutdown time of a device. Intervals may be on the order of seconds, minutes, hours, days, or multiple days. The control set of capacitive resulting signals may be absolute capacitive resulting signals, transcapacitive resulting signals, or a combination of both. They may be acquired and then, once it is determined that no input object is interacting with a sensing region, used as control signals. Determination module 320 then subtracts baseline values from the control set of capacitive resulting signals to achieve a set of differences. The baseline values are not values that are attributed to display coupled noise, instead the baseline values determined from the control set of signals are attributed to background capacitances in the system subject to environmental changes such as thermal noise. Determination module 320 then determines absolute values of a set of weights needed to normalize the set of differences. Then determination module 320 estimates the weighted noise parameters by dividing each of the absolute values of the set of weights by a maximum absolute value of the absolute values. It is appreciated that one or more portions of this technique for estimating weighted noise parameters may be performed iteratively and then averaged with other similar portions.

In some embodiments, the weighted noise parameters are fixed values that may be provided to determination module, such as in a factory setting, or else determined once by determination module and set. In some embodiments, a set of estimated values may be empirically determined for a hardware configuration and then utilized as a fixed value in other identical hardware configurations (e.g., in other examples of the same model of an electronic device). In other embodiments, the weighted noise parameters are adaptive values which may be set with some initial value, but which can be revised over time. As but one example, in some embodiments, sensor electrodes may separate from a display device as they age, thus causing changes in display noise coupling to the sensor electrodes. By re-estimating the weighted noise parameters at various intervals, they may be adapted to capture small changes in the variable portion of display coupled noise.

General Technique of Weighting for Display Noise Removal

It should be appreciated that there are various ways that a variable portion of display coupled noise can be estimated. By way of example, and not of limitation, one technique is described herein.

For various transcapacitance sensors, noise from an LCD display can be seen as an almost constant additive signal to any simultaneous transcapacitance measurements. Since different sets of transmitter electrodes are activated separately and all receiver electrodes are measure simultaneously, this is observed as offsets that are roughly constant along each transmitter electrode. However, there is a significant portion of this display noise that is variable along the transmitter electrode. This variation violates the "constant offset" assumption that several common-mode or unison noise removal schemes conventionally make. This violation exhibits itself as additional noise in the transcapacitive image after these noise removal schemes have been applied. Similar noise issues exist in absolute capacitive measurements, and the discussion below is applicable to absolute capacitive measurements as well as to the transcapacitive measurements which are discussed by way of example.

The measured transcapacitance in a sensor with the baseline value subtracted off, $\Delta C_{ij}$, is described by Equation 1. In some embodiments, the subtraction is performed by processing system 110A, such as by determination module 320. $\Delta C_{ij}$ has previously been assumed to be broken into three parts: Gaussian capacitive pixel noise, $n_{ij}$, that is independently and identically distributed signal coming from object in proximity to or touching the sensor $s_{ij}$, and display noise $d_j$ that is constant along transmitter $T_j$.

$$\Delta C_{ij} = s_{ij} + n_{ij} + d_j \qquad \text{Equation 1}$$

The above values described in Equation 1 are associated with receiver sensor electrodes and transmitter sensor electrodes, where the i dimension is assumed to be associated with the receiver sensor electrodes and the j dimension is assumed to be associated with the transmitter sensor electrodes. In an embodiment where absolute capacitive sensing is performed, the transmitter sensor electrode and receiver sensor electrode are the same. There can also be a variation in the display noise along the receiver electrode dimension as well. To account for this variation in display noise along the receiver electrode dimension, Equation 1 is changed slightly to arrive at Equation 2.

$$\Delta C_{ij} = s_{ij} + n_{ij} + w_i d_j \qquad \text{Equation 2}$$

A weight associated with the coupling between a receiver electrode and the display can be calculated, and included in Equation 2. In some embodiments, the weight is calculated by processing system 110A, such as by determination module 320. In Equation 2 then, $w_i$, is a weight associated with the coupling between the receiver, $R_i$, and the display. In general, longer receiver electrodes would have a larger coupling to the display. When interested in the variation of the display noise between receiver electrodes, only the relative couplings between the receiver electrodes and the display may need to be estimated.

The conventional assumption that these weights are constant can be tested and disproved by looking at a single image of transcapacitance data taken with the display on and no input object touching or interaction with the sensor, such that $s_{ij}=0$. First, the baseline for the empty capacitive sensor is estimated by taking many measurements (or capacitive sensing "frames") and averaging the measurements together. In some embodiments, this baseline capturing and averaging is performed by processing system 110A, such as by determination module 320 in cooperation with sensor module 310. For example, the transcapacitive image captured in a measured frame can be averaged with many other transcapacitive images captured in other frames. Second, a new frame from the capacitive sensor is measured with no input object touching or interacting with it is measured, and then subtracted from the baseline, resulting in $\Delta C_{ij}$. In some embodiments, this subtraction is performed by processing system 110A, such as by determination module 320. Third, the trace associated with each transmitter electrode is normalized by the sign (+/−) of the value along that transmitter electrode that is furthest from zero. In some embodiments, this normalization is performed by processing system 110A, such as by determination module 320. The result of these three procedures is represented by Equation 3, where k represents the receiver electrode with the largest absolute value of display noise.

$$N_{ij} = \text{sign}(\Delta C_{kj})\Delta C_{ij}, \quad k: |\Delta C_{kj}| = \max_i |\Delta C_{ij}| \qquad \text{Equation 3}$$

To obtain the actual estimate for the weights, $\hat{w}_i$, the procedure is applied to multiple capacitive frames. Once the normalized transcapacitance curves are obtained for each transmitter electrodes, the receiver electrodes from each transmitter electrode and from each frame using a weighted mean are combined, where the weight is given by the unsigned absolute maximum value associated with the transmitter electrode. This simplifies to the expression shown in Equation 4.

$$\hat{w}_i = \frac{1}{W} \sum_{\text{frames}} \sum_j N_{ij} \qquad \text{Equation 4}$$

In Equation 4, $$W = \max_i \sum_{\text{frames}} \sum_j N_{ij}.$$

A property of this weighting scheme is that the noise term, $n_{ij}$, averages to zero with both sums. In the case where $n_{ij}$ averages to zero, Equation 4 simplifies to Equation 5, which is normalized for the weights that will be utilized to weight for display noise removal in a capacitive sensor. In some embodiments, the normalization is performed by processing system 110A, such as by determination module 320.

$$\hat{w}_i = \frac{w_i}{\max_i w_i} \qquad \text{Equation 5}$$

In transcapacitive sensing, the weights may be applied to an individual transcapacitive image or resulting signal before the common-mode/unison noise removal procedure is performed. In some embodiments, this weighting is performed by processing system 110A, such as by determination module 320. This is done by first dividing the image values (resulting signals) associated with an individual receiver by the appropriate weight and then passing the weighted image to the noise removal algorithm, which may be a conventional noise removal algorithm (i.e., filter) that treats display noise as a constant. In some embodiments, the noise removal is performed by processing system 110A, such as by determination module 320. After the noise removal algorithm is performed, the weighting may be undone before further processing happens. In some embodiments, this de-weighting is performed by processing system 110A, such as by determination module 320. This is done by multiplying each of the filtered values associated with an individual receiver by the appropriate weight.

In absolute capacitive sensing, the weights may be applied to an individual absolute capacitive image or resulting signal before the common-mode/unison noise removal procedure is performed. In some embodiments, this weighting is performed by processing system 110A, such as by determination module 320. This is done by first dividing the measured absolute capacitive values (resulting signals) associated with an individual receiver by the appropriate weight and then passing the weighted values to the noise removal algorithm, which may be a conventional noise removal algorithm (i.e., filter) that treats display noise as a constant. In some embodiments, the noise removal is performed by processing system 110A, such as by determination module 320. After the noise removal algorithm is performed, the weighting may be undone before further processing happens. In some embodiments, this de-weighting is performed by processing system 110A, such as by determination module 320. This is done by multiplying each of the filtered values associated with an individual receiver by the appropriate weight.

Figure 4:
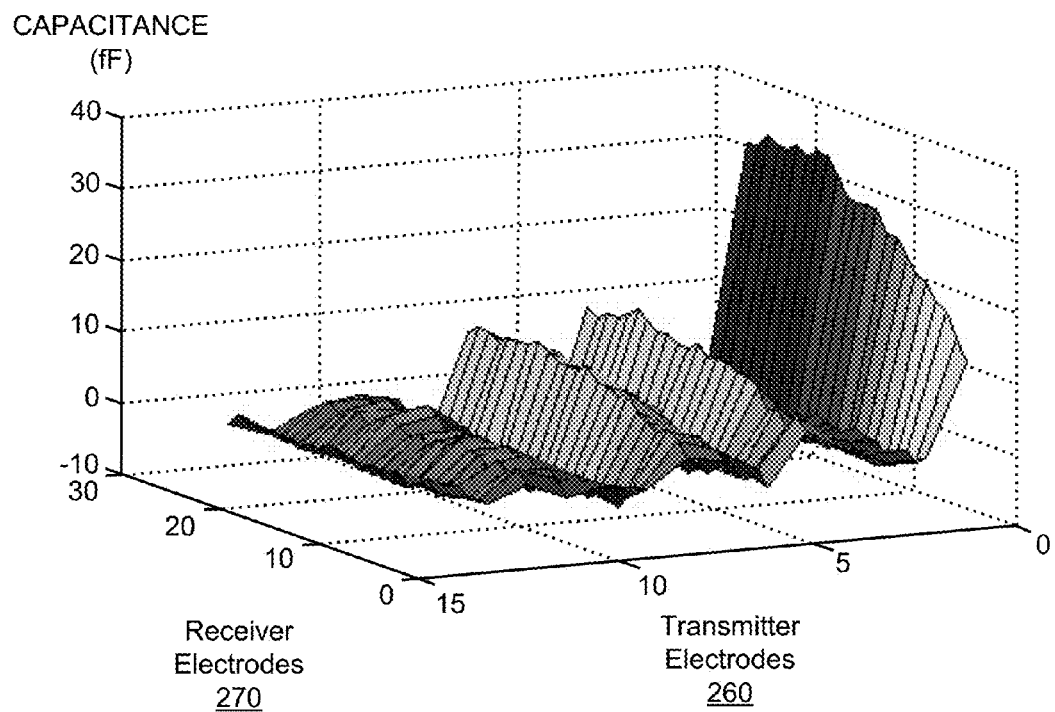
FIG. 4 depicts raw measurement data from capacitive sensor electrodes before display noise removal.

FIG. 4 depicts raw measurement data from capacitive sensor electrodes before display noise removal. The depicted graphical information shows the measured resulting signals of a transcapacitive capacitive image before display noise removal. The raw values represent resulting signals captured when no input object is interacting with the sensing region that is associated with the resulting signals. The y-axis shows transmitter electrodes 260-0 through 260-15 (for a total of 15 transmitter electrodes 260). The x-axis shows data for receiver electrodes 270-0 through 270-25 (for a total of 26 receiver electrodes 270) displayed on an expanded axis labeled as if the receiver electrodes go from 0-30. The z-axis is labeled in capacitive units of femtoFarads, associated with the magnitude of a resulting signal for a capacitive pixel denoted by the intersection of a receiver electrode and a transmitter electrode in the graphical data. As can be seen, the measured data in the absence of an input object is not uniform and has numerous peaks and valleys. This is largely due to display coupled noise that is coupled from a co-located display (e.g., the display of a smartphone, tablet, smart watch, etc.) into the sensor electrodes on which the resulting signals are received.

Figure 5:
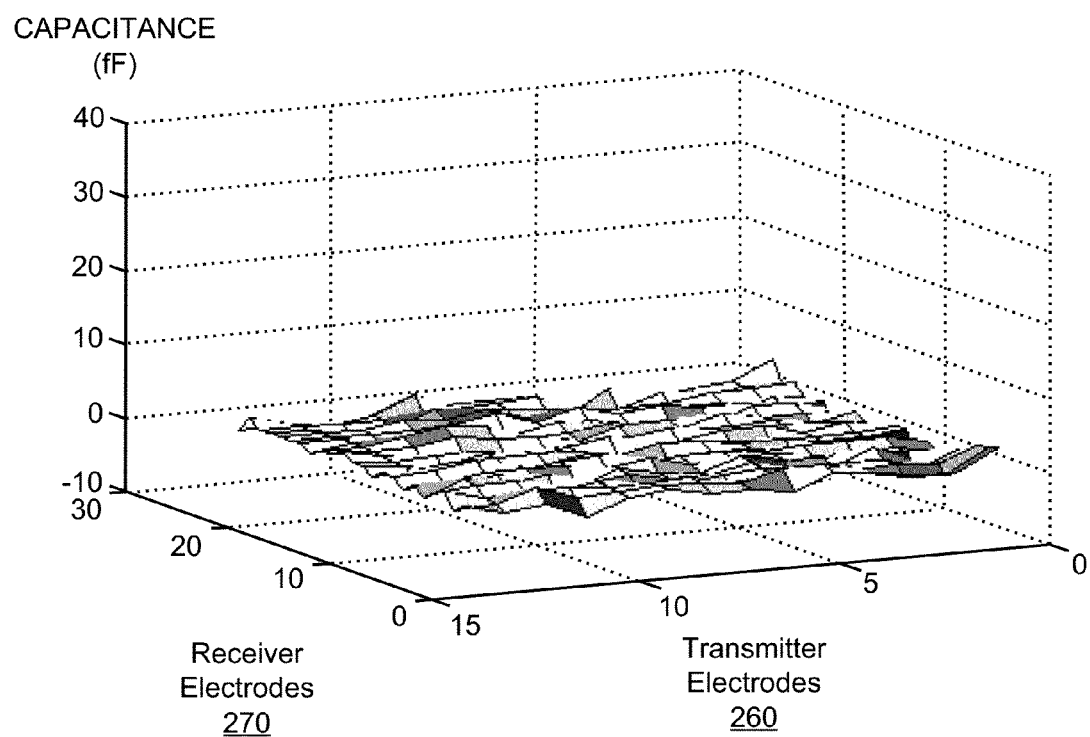
FIG. 5 depicts the result of removing display noise from the raw measurement data of FIG. 4 using a technique for weighted noise removal, according to embodiments described herein.

FIG. 5 depicts the result of removing display noise from the raw measurement data of FIG. 4 using a technique for weighted noise removal, according to embodiments described herein. In FIG. 5, the depicted graphical information shows the same measured resulting signals of a capacitive image after display noise removal using a technique, as described herein, where display noise is treated as having a variable offset component that is different (varies) from receiving sensor electrode to receiving sensor electrode. The x, y, and z axes are the same as in FIG. 4. As can be seen, the extreme peaks and valleys are now removed, and the processed resulting signals are much more uniform. When this noise removal technique is applied to resulting signals acquired when an input object is present in the sensing region associated with the sensor electrodes, the processed resulting signals (similar to those of FIG. 5) will more clearly show any peaks that are associated with the input object, rather than having the peaks obfuscated by variable components of display noise.

Example Methods of Operation

Figure 6B:
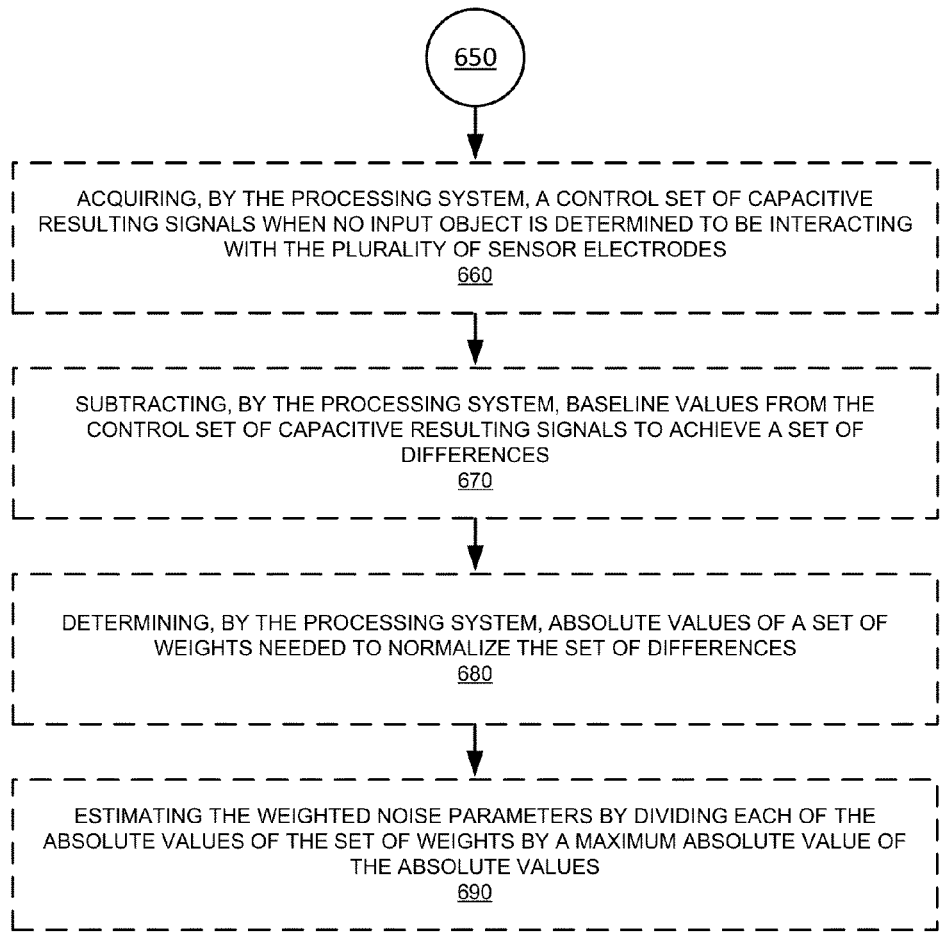

FIGS. 6A and 6B illustrate a flow diagram 600 of an example method of capacitive sensing, according to various embodiments. Procedures of this method will be described with reference to elements and/or components of one or more of FIGS. 1-5. It is appreciated that in some embodiments, the procedures may be performed in a different order than described, that some of the described procedures may not be performed, and/or that one or more additional procedures to those described may be performed.

With reference to FIG. 6A, at procedure 610 of flow diagram 600, in one embodiment, a processing system, such as processing system 110A, operates a plurality of sensor electrodes to acquire a plurality of capacitive resulting signals of capacitive resulting signals. In some embodiments, sensor module 310 of processing system 110A operates the sensor electrodes to capture the capacitive resulting signals. The capacitive resulting signals may be transcapacitive resulting signals, absolute capacitive resulting signals, or a mixture of both transcapacitive and absolute capacitive resulting signals.

With continued reference to FIG. 6A, at procedure 620 of flow diagram 600, in one embodiment, the processing system weights values of the plurality of capacitive resulting signals to achieve a plurality of weighted capacitive resulting signals. The weights, in one embodiment have been predetermined. For example, a first capacitive resulting signal of the plurality of capacitive resulting signals is weighted according to a weighted noise parameter derived from a component of a variable noise associated with a respective sensor electrode used for acquisition of the first capacitive resulting signal, wherein the variable noise varies across the plurality of sensor electrodes. That is, the variable portion of noise is a fixed value on any one sensor electrode being used as a receiver, but that fixed value may differ from the value of a variable portion of noise associated with another sensor electrode. Accordingly, in some embodiments, the processing system weights a second capacitive resulting signal of the plurality of capacitive resulting signals according to a second weighted noise parameter derived from a second component of the variable noise associated with a second respective sensor electrode used for acquisition of the second capacitive resulting signal, wherein different weighted noise parameters are used for weighting the first capacitive resulting signal and the second capacitive resulting signal. The weighted noise parameters differ due to a different amount of display noise being coupled with each of the two respective sensor electrodes. As discussed above, division of a resulting signal by a weighting parameter associated with the sensor electrode which received the capacitive resulting signal may accomplished to perform the weighting. The weighting, flattens or normalizes the capacitive resulting signals. In some embodiments, the weighting is accomplished by determination module 330 of processing system 110A.

With continued reference to FIG. 6A, at procedure 630 of flow diagram 600, in one embodiment, the processing system filters the weighted capacitive resulting signals to remove common noise and to achieve a plurality of filtered capacitive resulting signals. It is appreciated that any filter that filters out a constant component of display noise may be utilized. This includes many conventional filters. In some embodiments, the filtering is accomplished by determination module 330 of processing system 110A.

With continued reference to FIG. 6A, at procedure 640 of flow diagram 600, in one embodiment, the processing system de-weights the filtered capacitive resulting signals according to the weighted noise parameters to achieve a plurality of processed capacitive resulting signals. If division by a weighting parameter is used for weighting, multiplication by the weighting parameter may be used for the de-weighting. In some embodiments, the de-weighting is accomplished by determination module 330 of processing system 110A.

With continued reference to FIG. 6A, at procedure 650 of flow diagram 600, in one embodiment, the processing system determines a capacitive image from the processed capacitive resulting signals. In some embodiments, the capacitive image determined or created by determination module 330 of processing system 110A. The capacitive image may be a transcapacitive image, an absolute capacitive image, or a hybrid capacitive image. Known techniques for generating such capacitive images may be employed. The processing system, may then utilize the capacitive image to determine the position of an input object in a sensing region associated with the sensor electrodes on which the capacitive resulting signals are received.

With reference to FIG. 6B, as illustrated in procedure 660 of flow diagram 600, in some embodiments, the method as described in 610-650 further comprises the processing system acquiring a control set of capacitive resulting signals when no input object is determined to be interacting with the plurality of sensor electrodes. In some embodiments, sensor module 310 of processing system 110A operates the sensor electrodes to capture the control set of capacitive resulting signals. The control set of capacitive resulting signals may be transcapacitive resulting signals, absolute capacitive resulting signals, or a mixture of both transcapacitive and absolute capacitive resulting signals.

With continued reference to FIG. 6B, as illustrated in procedure 670 of flow diagram 600, in some embodiments, the processing system subtracts baseline values from the control set of capacitive resulting signals to achieve a set of differences. The baseline values. The baseline values are not values that are attributed to display coupled noise, instead the baseline values determined from the control set of signals are attributed to background capacitances in the system subject to environmental changes such as thermal noise. In some embodiments, determination module 320 of processing system 110A subtracts to baseline value to achieve the set of differences.

With continued reference to FIG. 6B, as illustrated in procedure 680 of flow diagram 600, in some embodiments, the processing system determines absolute values of a set of weights needed to normalize the set of differences. This is described in conjunction with Equations 3 and 4 above. In some embodiments, determination module 320 of processing system 110A determines these absolute values of a set of weights. It should be appreciated that the set of weights includes a weight for each sensor electrode that has been used to receive a capacitive resulting signal.

With continued reference to FIG. 6B, as illustrated in procedure 690 of flow diagram 600, in some embodiments, the processing system estimates the weighted noise parameters by dividing each of the absolute values of the set of weights by a maximum absolute value of the absolute values. In some embodiments, determination module 320 of processing system 110A estimates the weighted noise parameter. It should be appreciated that the estimation results in a weighted noise parameter for each sensor electrode that has been used to receive a capacitive resulting signal of the control set of capacitive resulting signals discussed in procedure 660.

In some embodiments, procedures the estimated weights are viewed as fixed values and are not changed over time. In other embodiments, procedures 660-690 may be conducted at intervals or at certain times in order to either determine new weighted noise parameters or to adapt existing weighted noise parameters in case a variable portion of display noise coupling has changed over time.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A processing system for a capacitive sensing input device, said processing system comprising:

a sensor module configured to acquire a plurality of capacitive resulting signals by operating a plurality of sensor electrodes for capacitive sensing; and a determination module configured to:
weight values of said plurality of capacitive resulting signals to achieve a plurality of weighted capacitive resulting signals, wherein a first capacitive resulting signal of said plurality of capacitive resulting signals is weighted according to a weighted noise parameter derived from a component of a variable noise associated with a respective sensor electrode used for acquisition of said first capacitive resulting signal, wherein said variable noise varies across said plurality of sensor electrodes; and determine positional information for an least input object in a sensing region of the capacitive sensing input device based on resulting signals processed from said weighted capacitive resulting signals, wherein said determination module is further configured to:
filter said weighted capacitive resulting signals to remove common noise and to achieve a plurality of filtered capacitive resulting signals; and de-weight said filtered capacitive resulting signals according to said weighted noise parameters to achieve a plurality of processed capacitive resulting signals.

2. The processing system of claim 1, wherein said sensor module is configured to acquire said first capacitive resulting signal by driving a first sensor electrode of said plurality of sensor electrodes with a transmitter signal and receiving said first capacitive resulting signal with a second sensor electrode of said plurality of sensor electrodes, wherein said first and second sensor electrodes are different sensor electrodes, and wherein said first capacitive resulting comprises effects corresponding to said transmitter signal.

3. The processing system of claim 1, wherein said sensor module is configured to acquire said first capacitive resulting signal by driving a first sensor electrode of said plurality of sensor electrodes with a transmitter signal and receiving said first capacitive resulting signal with said first sensor electrode.

4. The processing system of claim 1, wherein said determination module is further configured to: determine a transcapacitive image from said plurality of processed capacitive resulting signals.

5. The processing system of claim 1, wherein said determination module is further configured to:
acquire a control set of capacitive resulting signals when no input object is determined to be interacting with said plurality of sensor electrodes;
subtract baseline values from said control set of capacitive resulting signals to achieve a set of differences;
determine absolute values of a set of weights needed to normalize the set of differences; and
estimate said weighted noise parameters by dividing each of said absolute values of said set of weights by a maximum absolute value of said absolute values.

6. The processing system of claim 1, said determination module is further configured to:
weight a second capacitive resulting signal of said plurality of capacitive resulting signals according to a second weighted noise parameter derived from a second component of said variable noise associated with a second respective sensor electrode used for acquisition of said second capacitive resulting signal, wherein different weighted noise parameters are used for weighting said first capacitive resulting signal and said second capacitive resulting signal.

7. The processing system of claim 1, wherein said variable noise is a display coupled noise coupled from a display to said plurality of sensor electrodes.

8. The processing system of claim 1, wherein said weighted noise parameters are fixed values.

9. The processing system of claim 1, wherein said weighted noise parameters are adaptive values.

10. A method of capacitive sensing comprising:
operating, by a processing system, a plurality sensor of electrodes to acquire a plurality of capacitive resulting signals of capacitive resulting signals;
weighting, by said processing system, values of said plurality of capacitive resulting signals to achieve a plurality of weighted capacitive resulting signals, wherein a first capacitive resulting signal of said plurality of capacitive resulting signals is weighted according to a weighted noise parameter derived from a component of a variable noise associated with a respective sensor electrode used for acquisition of said first capacitive resulting signal, wherein said variable noise varies across said plurality of sensor electrodes;
filtering, by said processing system, said weighted capacitive resulting signals to remove common noise and to achieve a plurality of filtered capacitive resulting signals;
de-weighting, by said processing system, said filtered capacitive resulting signals according to said weighted noise parameters to achieve a plurality of processed capacitive resulting signals; and
determining, by said processing system, a capacitive image from said processed capacitive resulting signals.

11. The method of claim 10, further comprising:
acquiring, by said processing system, a control set of capacitive resulting signals when no input object is determined to be interacting with said plurality of sensor electrodes;
subtracting, by said processing system, baseline values from said control set of capacitive resulting signals to achieve a set of differences;
determining, by said processing system, absolute values of a set of weights needed to normalize the set of differences; and
estimating said weighted noise parameters by dividing each of said absolute values of said set of weights by a maximum absolute value of said absolute values.

12. The method of claim 10, wherein said weighting values of said plurality of capacitive resulting signals to achieve a plurality of weighted capacitive resulting signals further comprises:
weighting a second capacitive resulting signal of said plurality of capacitive resulting signals according to a second weighted noise parameter derived from a second component of said variable noise associated with a second respective sensor electrode used for acquisition of said second capacitive resulting signal, wherein different weighted noise parameters are used for weighting said first capacitive resulting signal and said second capacitive resulting signal.

13. A capacitive sensing input device, comprising:
a display;
a plurality of sensor electrodes; and
a processing system configured to:
acquire a plurality of capacitive resulting signals by operating a plurality of sensor electrodes for capacitive sensing;
weight values of said plurality of capacitive resulting signals to achieve a plurality of weighted capacitive resulting signals, wherein a first capacitive resulting signal of said plurality of capacitive resulting signals is weighted according to a weighted noise parameter derived from a component of a variable noise associated with a respective sensor electrode used for acquisition of said first capacitive resulting signal, wherein said variable noise varies across said plurality of sensor electrodes; and
determine positional information for an least input object in a sensing region of the capacitive sensing input device based on resulting signals processed from said weighted capacitive resulting signals,
wherein said processing system is further configured to:
filter said weighted capacitive resulting signals to remove common noise and to achieve a plurality of filtered capacitive resulting signals; and
de-weight said filtered capacitive resulting signals according to said weighted noise parameters to achieve a plurality of processed capacitive resulting signals.

14. The capacitive sensing input device of claim 13, wherein said processing system is further configured to:
acquire said first capacitive resulting signal by driving a first sensor electrode of said plurality of sensor electrodes with a transmitter signal and receiving said first capacitive resulting signal with a second sensor electrode of said plurality of sensor electrodes, wherein said first and second sensor electrodes are different sensor electrodes, and wherein said first capacitive resulting signal comprise effects corresponding to said transmitter signal.

15. The capacitive sensing input device of claim 13, wherein said processing system is further configured to:
acquire said first capacitive resulting signal by driving a first sensor electrode of said plurality of sensor electrodes with a transmitter signal and receiving said first capacitive resulting signal with said first sensor electrode.

16. The capacitive sensing input device of claim 1, wherein said processing system is further configured to: determine a transcapacitive image from said plurality of processed capacitive resulting signals.

17. The capacitive sensing input device of claim 13, wherein said processing system is further configured to:
acquire a control set of capacitive resulting signals when no input object is determined to be interacting with said plurality of sensor electrodes;
subtract baseline values from said control set of capacitive resulting signals to achieve a set of differences;
determine absolute values of a set of weights needed to normalize the set of differences; and
estimate said weighted noise parameters by dividing each of said absolute values of said set of weights by a maximum absolute value of said absolute values.

18. The capacitive sensing input device of claim 13, wherein said processing system is further configured to:
weight a second capacitive resulting signal of said plurality of capacitive resulting signals according to a second weighted noise parameter derived from a second component of said variable noise associated with a second respective sensor electrode used for acquisition of said second capacitive resulting signal, wherein different weighted noise parameters are used for weighting said first capacitive resulting signal and said second capacitive resulting signal.

\* \* \* \* \*